United States Patent [19]

Kinney, Jr. et al.

[11] Patent Number: 4,514,202
[45] Date of Patent: Apr. 30, 1985

[54] AIR STREAM ENTRAINED WATER ELIMINATOR FOR CROSS FLOW COOLING TOWER

[75] Inventors: Ohler L. Kinney, Jr., Leawood; Joyce D. Holmberg, Overland Park, both of Kans.

[73] Assignee: The Marley Cooling Tower Company, Mission, Kans.

[21] Appl. No.: 649,617

[22] Filed: Sep. 12, 1984

Related U.S. Application Data

[63] Continuation of Ser. No. 488,096, Apr. 25, 1983, abandoned.

[51] Int. Cl.³ .............................................. B01D 45/16
[52] U.S. Cl. ........................................ 55/440; 55/442; 55/257 PV; 261/DIG. 11
[58] Field of Search ...................... 55/186, 188, 257 R, 55/257 PV, 257 PP, 440, 442, 444, 464; 261/112, DIG. 1

[56] References Cited

U.S. PATENT DOCUMENTS

| | | | |
|---|---|---|---|
| 1,834,534 | 12/1931 | Richards et al. | 55/440 |
| 3,405,511 | 10/1968 | Halter et al. | 55/440 |
| 3,938,972 | 2/1976 | Sugimura | 55/440 |
| 4,040,824 | 8/1977 | Kinney | 55/257 R |
| 4,141,706 | 2/1979 | Regehr | 55/440 X |
| 4,333,749 | 6/1982 | Holmberg et al. | 55/257 PV |

Primary Examiner—Charles Hart
Attorney, Agent, or Firm—Schmidt, Johnson, Hovey & Williams

[57] ABSTRACT

An improved, three path, cellular drift eliminator is provided which effectively removes entrained water particles from high velocity moist air streams leaving a crossflow cooling tower fill structure by the use of spaced, cellular, diversion path-defining structures strategically located and arranged to facilitate maximum drift elimination. The eliminator preferably includes a plurality of discrete cells, each cell comprising three air diversion sections along the length thereof in order to divert fill derived air along a serpentine path for drift elimination purposes. The moist air is first diverted at an upward angle and laterally relative to the initial path thereof by the inlet diversion section, and thereafter is rediverted upwardly and laterally of the first diversion path by the intermediate diversion section. The air is finally rediverted in the direction of its initial path, and discharged upwardly at an angle of at least about 20 degrees and not greater than about 60 degrees to the horizontal by the outlet diversion section. Downward draining perforations between the inlet and intermediate diversion sections allow for rapid discharge of accumulated liquid within the eliminator.

6 Claims, 12 Drawing Figures

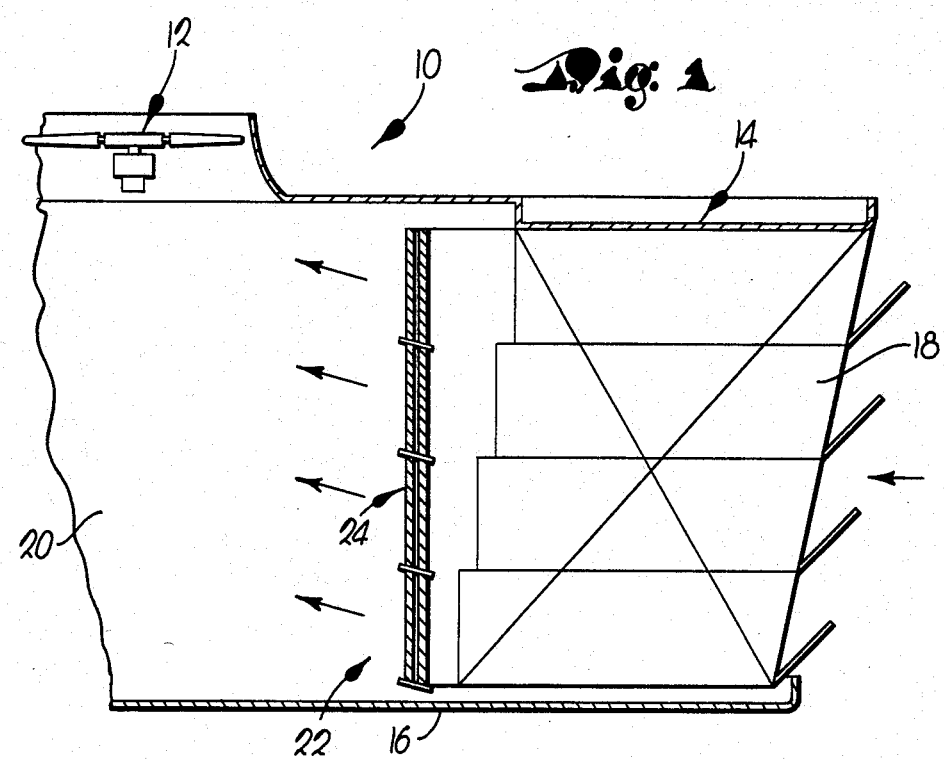
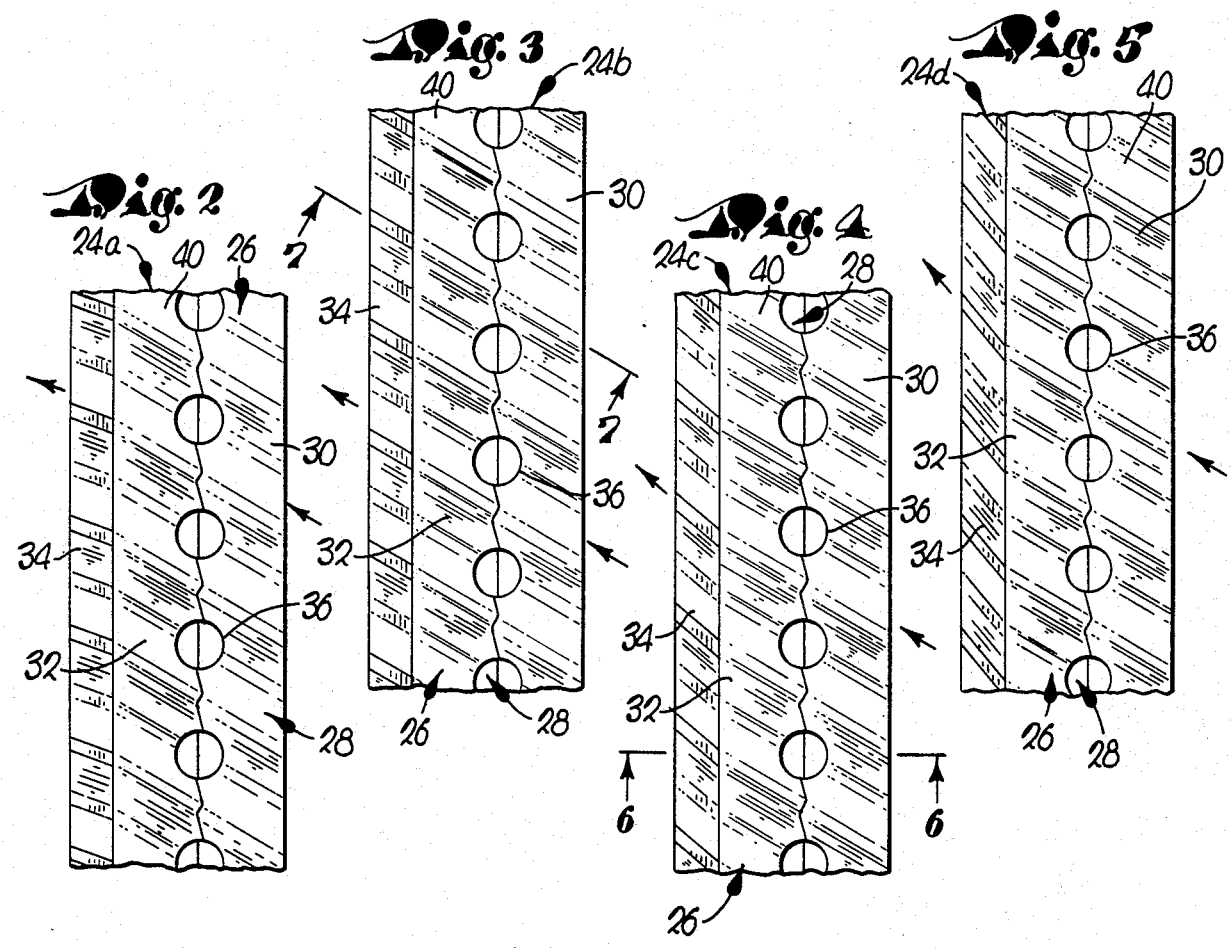

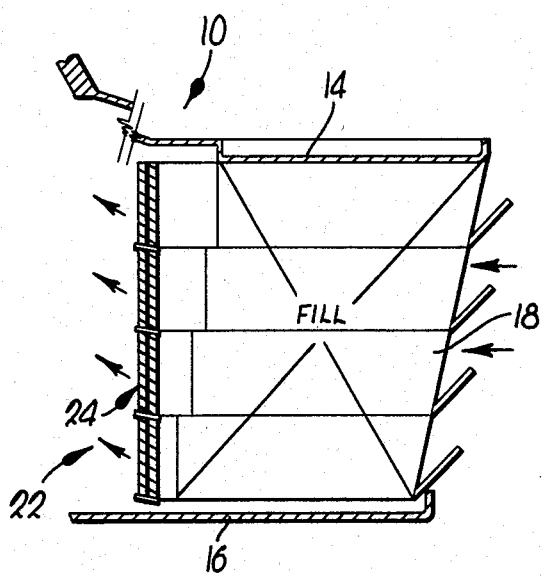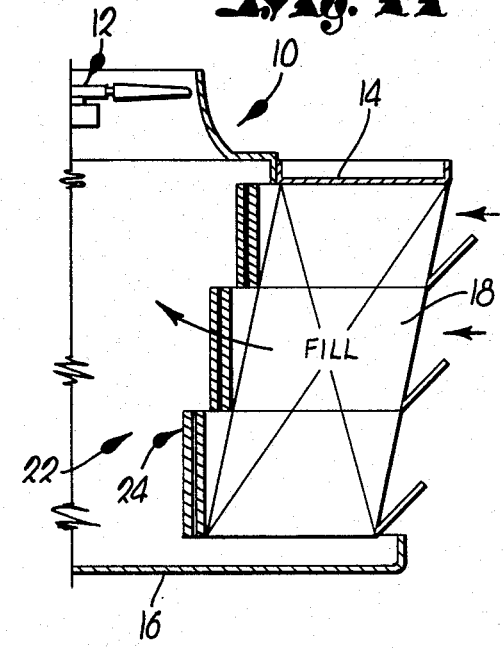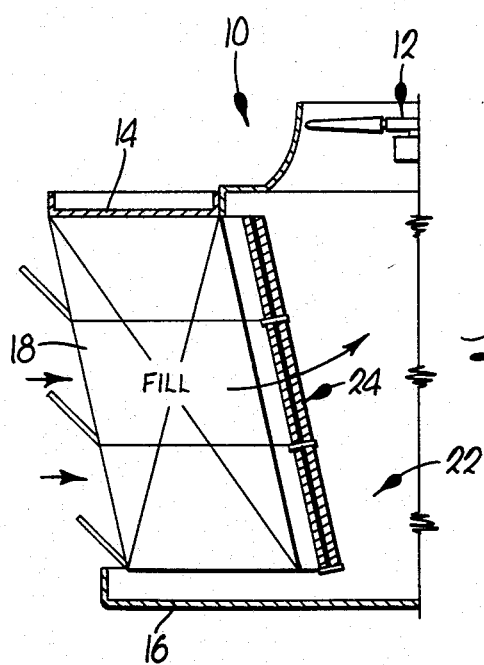

AIR STREAM ENTRAINED WATER ELIMINATOR FOR CROSS FLOW COOLING TOWER

This is a continuation of application Ser. No. 488,096 filed on Apr. 25, 1983.

BACKGROUND OF THE INVENTION

1. Field of the Invention

This invention relates to crossflow water cooling towers and especially improved drift eliminator construction for effectively removing entrained water particles from generally horizontally directed air currents leaving the tower fill structure. More particularly, it is concerned with such a drift eliminator which serves to remove a significant portion of the entrained water particles in the air leaving the tower fill, while at the same time avoiding undue pressure drops; in addition, the construction of the eliminator allows individual water drainage from the respective diversion paths, so that troublesome water blockage and possible re-entrainment typically associated with crossflow eliminator structure is avoided.

2. Description of the Prior Art

In evaporative water cooling towers of the crossflow variety, thermal energy is removed from initially hot water by causing the latter to gravitate through a surface-increasing fill assembly in crossflowing intersecting relationship to currents of cool air directed through the fill. Drift eliminators are usually provided to remove entrained droplets or particles from the air leaving the tower fill structure. If drift eliminator structures are not employed in such towers, substantial quantities of water can be discharged into the atmosphere. This results in undesirable operating conditions leading to excessive wetting of surrounding areas and corresponding coating thereof with mineral deposits. In addition, icing of adjacent equipment and structures can readily occur during wintertime operations. Thus, adequate drift elimination is very necessary with evaporative type cooling towers, especially when large towers are used in metropolitan areas, as part of a large industrial complex where cold weather occurs, or because of ecological concerns where saline water is circulated through the tower.

Although it is desirable from a theoretical standpoint to remove essentially all water particles from cooling tower discharge air, as a practical matter this is an impossibility. Given this constraint, it is important that the particle size distribution of discharged water droplets be the most desirable from the standpoint of avoiding excessive wetting closely adjacent the tower. If, for example, the entrained water particles are relatively large and hence massive, they will tend to deposit on equipment or structures close to the tower. On the other hand, if the entrained particles are of relatively small size, there is a greater tendency for the water to spread and diffuse over a much larger area. In the latter case, undue icing or damage to adjacent equipment or the like is avoided. Therefore, it is important not only to remove as much water as possible on an absolute basis from fill-derived air, but also to ensure that the water which does escape to the atmosphere be predominantly of small particle size.

U.S. Pat. No. 4,040,824 describes a dual path drift eliminator structure which is particularly designed for crossflow cooling towers. The drift eliminator described in U.S. Pat. No. 4,040,824 includes side-by-side cellular drift eliminator sections separated by an elongated, upright, channel or spacing which permits water to drain vertically from the eliminator.

U.S. Pat. No. 4,333,749 describes a triple path drift eliminator structure which is particularly designed for counterflow water cooling towers. The use of a three-path drift eliminator in counterflow water cooling towers has resulted in greatly enhanced drift elimination while avoiding undue pressure drops.

While the dual path drift eliminator structure described in U.S. Pat. No. 4,040,824 and the three path counterflow drift eliminator structure described in U.S. Pat. No. 4,333,749 both represent real advances in the art for crossflow and counterflow drift eliminator structures respectively, there has heretofore been no attempt to provide a three-path drift eliminator structure for crossflow cooling towers. This is partially due to the unresolved problem of water blockage in crossflow eliminator structures of extended axial length, as is needed to accommodate three path eliminator structures. Accordingly, there is a need for an improved cellular-type drift eliminator structure which provides the enhanced drift elimination capabilities of a three-path eliminator structure for crossflow water cooling towers, which provides for downward water drainage, without imposing undue pressure drops by the use thereof.

SUMMARY OF THE INVENTION

The drift eliminator of the present invention successfully incorporates the advantages of three-path drift eliminator structures into crossflow cooling tower applications, while providing for adequate downward water drainage and without imposing undue presssure drops within the tower structure. The drift eliminator of the present invention preferably includes structure having walls defining a plurality of elongated, discrete cells for passage of moisture laden air therethrough, with each of the cells presenting inlet, intermediate and outlet elongated air diversion sections. Downward draining perforations are provided between the inlet and intermediate diversion sections so that accumulated water is rapidly removed from the eliminator structure. Undue pressure drops are avoided by directing the moist air continuously upwardly, and discharging the air from the outlet diversion section upwardly at an angle of at least about 20 degrees and not greater than about 60 degrees. Drift elimination is enhanced by laterally diverting the air through the inlet and intermediate diversion sections.

In particularly preferred forms, the drift eliminator structure includes spaced, opposed, face-to-face wall members presenting first, second and third generally planar panels with corrugated wall elements disposed between and secured to respective pairs of the wall members. In this fashion, the eliminator can be formed in packs, and such packs can in turn be supported in a crossflow cooling tower for drift elimination purposes.

When oriented in a crossflow cooling tower, the longitudinal axes of the inlet air diversion sections are oriented at an upward angle relative to the generally horizontal path of travel of the fill air. Similarly, the longitudinal axes of the intermediate air diversion sections are oriented at an angle relative to the original, horizontal path of travel of the fill air, and the inlet and intermediate sections are angled relative to each other to first divert the fill air laterally in one direction and then in the opposite direction. Finally, the longitudinal axes of the outlet air diversion sections are oriented in general alignment with the initial path of travel of the air, but are directed upwardly at an angle of at least about 20 degrees and not greater than about 60 degrees to the horizontal. In essence, the air passing through the eliminator follows a serpentine path and is ultimately discharged in an upwardly direction. During travel of the moisture-laden air through the eliminator, the entrained water particles impinge against the walls defining the air diversion sections in order that such water may be removed from the air. The water extracted from the air gravitates downwardly through the drainage perforations and ultimately exits the drift eliminator.

BRIEF DESCRIPTION OF THE DRAWINGS

FIG. 1 is an essentially schematic, fragmentary, vertical sectional view of a mechanical draft crossflow cooling tower with a plurality of multi-pack, vertically stacked eliminator sections positioned adjacent the exit face of the fill structure thereof;

FIG. 2 is a fragmentary, side elevational view of a three-path multi-cell eliminator pack in accordance with the present invention, with the outlet diversion sections at an angle of 20 degrees to the horizontal;

FIG. 3 is similar to FIG. 2 but with the outlet diversion sections at an angle of 30 degrees to the horizontal;

FIG. 4 is similar to FIG. 3 but with the outlet diversion sections at an angle of 40 degrees to the horizontal;

FIG. 5 is similar to FIG. 4 but with the outlet diversion section at an angle of 50 degrees to the horizontal;

FIG. 10 is an essentially schematic, fragmentary, vertical sectional view of a hyperbolic crossflow cooling tower shown with a plurality of multi-pack, vertically stacked eliminator sections positioned adjacent the exit face of the fill structure thereof;

FIG. 11 is an essentially schematic, fragmentary, vertical sectional view of a mechanical draft crossflow cooling tower, illustrating a plurality of vertically stacked eliminator sections in horizontally offset relationship with one another; and FIG. 12 is a view identical with that shown in FIG. 11 except that the eliminator sections are in an inclined, complemental orientation relative to the exit face of the tower.

DESCRIPTION OF THE PREFERRED EMBODIMENT

Figure 6:
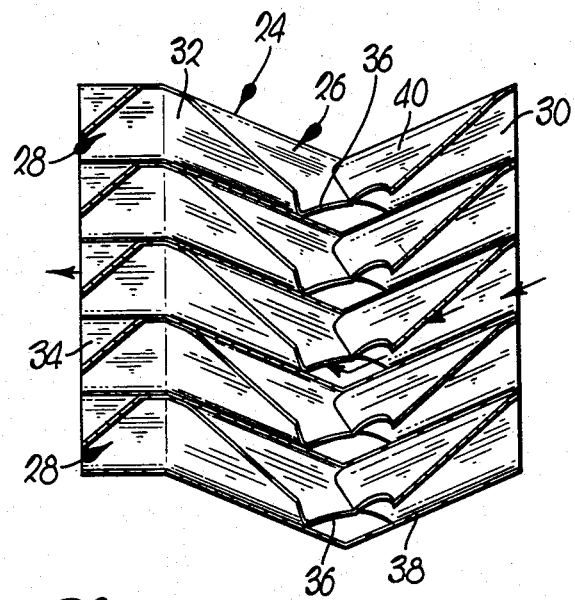
FIG. 6 is a sectional view taken along the line 6—6 of FIG. 4.
Figure 8:
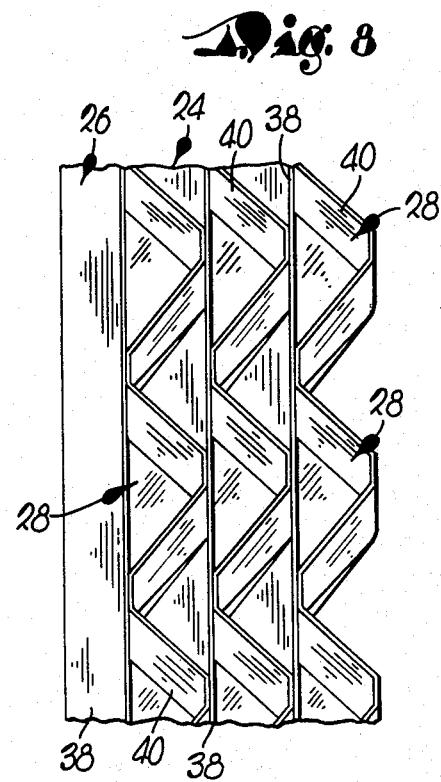
FIG. 8 is a fragmentary, end elevational view of the outlet face of the eliminator structure in accordance with the present invention.

FIG. 1 illustrates the use of a drift eliminator in accordance with the invention, in the context of a mechanical draft-inducing crossflow cooling tower 10. It is to be understood that the drift eliminator hereof is also applicable to hyperbolic crossflow cooling towers. The tower 10 includes a mechanical draft-inducing fan assembly 12, a hot water delivery basin 14, and a cold water collection basin 16. Upright, annular fill structure 18 defines a central plenum chamber 20, the chamber being in communication with the fan assembly 12.

The drift eliminator structure 22, comprising a plurality of individual eliminator packs 24, is received within the cooling tower 10, interposed between the fan assembly 12 and fill structure 18. The eliminator packs 24 are depicted in FIG. 1 as arranged in a generally upright single plane. The packs 24 are likewise depicted in FIG. 10 as arranged in a generally upright single plane in conjunction with a hyperbolic crossflow cooling tower 10'. It is to be understood, however, that the packs 24 may be organized in any manner, such as in a slanted plane as depicted in FIG. 12 or in a series of steps corresponding to the stepped levels of the fill structure 18 as in FIG. 11. Whatever the arrangement, however, the eliminator 22 will extend over essentially the entire length and width of the fill, such that essentially all air passing through the tower 10 passes through the eliminator 22. Broadly speaking, the purpose of the eliminator 22 is to remove entrained water particles from the air leaving fill assembly 18, and to ensure that the water which escapes removal and is discharged from tower 10 has a desirable size distribution; that is to say, is discharged as minute droplets. It is essential for energy conservation and efficiency considerations, however, that in fulfilling the purposes of removing entrained water particles, the eliminator causes as small a pressure drop within the cooling tower as possible.

Turning now to FIGS. 2 through 9, the construction of a preferred eliminator pack 24 in accordance with the invention will be described. The pack 24 includes walls 26 which define a plurality of elongated, continuous, discrete cells 28 for passage of moisture laden air therethrough. Each of the cells 28 presents inlet, intermediate and outlet elongated air diversion sections along the length thereof, which are defined by corresponding wall sections 30, 32, 34.

Figure 7:
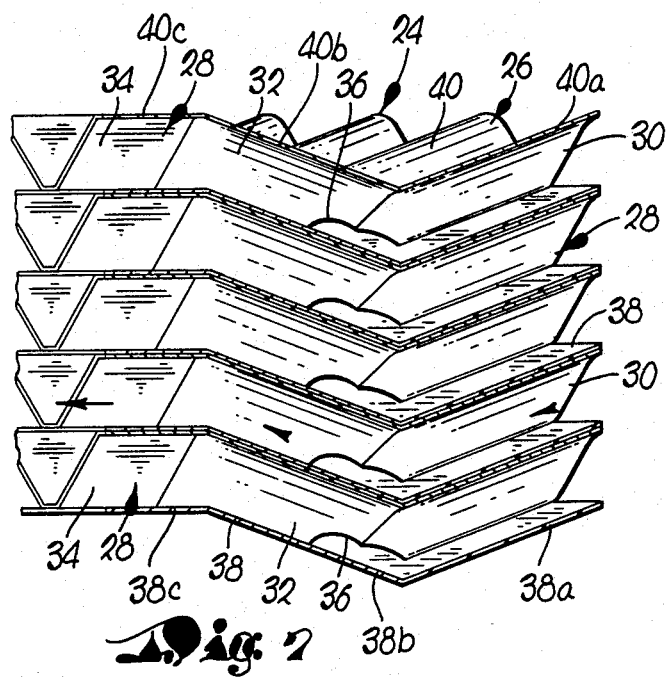
FIG. 7 is a sectional view taken along the line 7—7 of FIG. 3.
Figure 9:
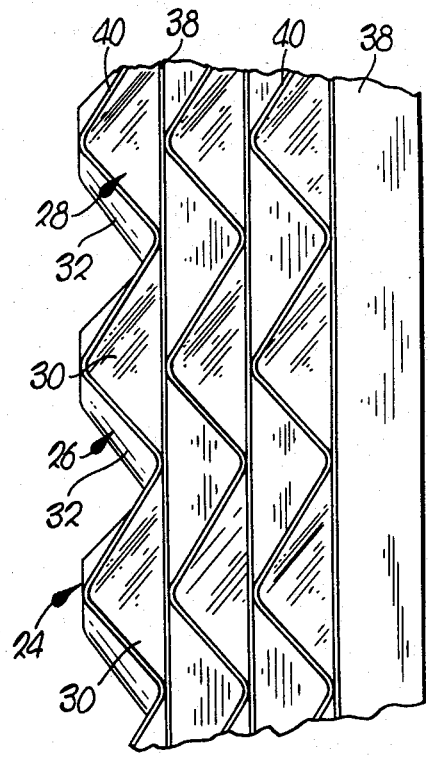
FIG. 9 is a fragmentary, elevational view of the inlet face of the eliminator structure in accordance with the present invention.

A study of FIGS. 6 and 7 will confirm that the respective air diversion sections are oriented such that the longitudinal axes of the inlet and intermediate sections are at an angle relative to one another. Furthermore, the longitudinal axes of the intermediate and outlet sections are at an angle relative to one another. In preferred forms of the invention the inlet and intermediate sections have longitudinal axes disposed in a first obliquely oriented plane. Also, the longitudinal axis of the outlet section is disposed in a second plane oriented at an angle relative to the first plane.

Another feature of the eliminator of the present invention is that certain of the walls 26 include perforations 36 at the intersection of the inlet and intermediate air diversion sections. The perforations 36 are distributed in vertical alignment such that water that accumulates within the eliminator will drain downwardly therethrough.

Although the cells 28 can be defined by corresponding walls of various configurations, it has been found that from a standpoint of cost and ease of fabrication that the eliminator should preferably include continuous, spaced apart, opposed face-to-face wall members 38 presenting first, second and third generally planar panels corresponding to the inlet, intermediate and outlet air diversion sections respectively and which are at an angle with respect to one another in the direction of air travel. Corrugated wall elements 40 are disposed between and adhesively secured to respective pairs of the wall members 38. The corrugated elements 40 are configured to abut and conform to the wall members 38 as will be seen from the drawings, and it is the corrugated wall members which include the downward draining apertures 36 therein. In practice, the wall members 38 and elements 40 are formed from a synthetic resin material such as polyvinylchloride using standard vacuum forming techniques.

Referring to FIG. 7, it will be seen that each of the wall members 38 includes first and second panels 38a and 38b which cooperatively present, in cross-section, a substantially V-shaped body, with a planar panel 38c secured to and extending from the end of panel 38b remote from panel 38a. By the same token, the corrugated wall elements 40 include first and second portions 40a and 40b which, in cross-section, are somewhat V-shaped, with a planar portion 40c designed to fit between and engage the panels 38c of respective pairs of the wall members 38. It will thus be appreciated that the alternating wall members 38 and wall elements 40 present peaks and valleys which cooperatively define therebetween the elongated cells 28.

Referring to FIGS. 2 through 5, it will be seen that the inlet diversion sections are oriented inwardly and upwardly at an angle of at least about 20 degrees to the horizontal relative to the initial, generally horizontal path of moist air in order to initially direct the moist air streams upwardly therethrough. In more definitive terms, this angle should broadly vary between about 10 degrees to 60 degrees relative to the horizontal in a crossflow tower application, more preferably from about 15 degrees to 50 degrees and most preferably at an angle of about 30 degrees. It will also be appreciated by viewing FIGS. 2 through 5 that the upward slope of the intermediate diversion sections is generally the same as the upward slope of the inlet diversion sections.

Referring to FIGS. 6 and 7, it will be appreciated that air entering the inlet sections of the eliminator is diverted laterally as well as upwardly, and is again diverted laterally, in an opposite direction, by the intermediate diversion sections.

The individual cells defining the outlet diversion sections should be oriented at an upwardly inclined angle relative to the horizontal in order to direct the moist air streams toward the fan 12. In more definitive terms, this angle should broadly vary from about 20 degrees to 60 degrees relative to the horizontal, more preferably from about 20 degrees to 50 degrees relative to the horizontal, and most preferably at an angle of between about 30 degrees and about 40 degrees. Referring to FIGS. 2 through 5, outlet angles of 20, 30, 40 and 50 degrees are respectively depicted for the eliminator packs 24a, 24b, 24c and 24d.

In the use of a drift eliminator in accordance with the present invention in the context of a crossflow water cooling tower, moisture-laden air from the fill assembly 18 passes generally horizontally from the fill assembly 18 to the drift eliminator structure 22. The moist air is directed into and serially through the inlet, intermediate and outlet elongated, interconnected, upwardly sloped air paths defined by the wall sections 30, 32 and 34 of the eliminator. During such travel, the moisture-laden air travels a somewhat serpentine path and is ultimately discharged in an upwardly direction toward the fan assembly 12. During the diversion of the air that passes through the eliminator, the entrained water particles inpinge against the walls defining the continuous cells 28, with the result that such water is removed from the air as it passes through the eliminator. Such removed water flows under the influence of gravity downwardly through the perforations 36 and drains from the eliminator into the cold water collection basin 16. A significant portion of entrained water particles in the air leaving the tower fill are therefore removed from the air, and the air particles that remain within the air and are exited from the fill structure through the fan to the atmosphere are of relatively small size so that excessive wetting of equipment and structures closely adjacent the tower is avoided.

We claim:

1. A drift eliminator adapted to be positioned in a crossflow cooling tower between the fill assembly and outlet chamber for removing moisture from the crossflowing, moisture-laden air exiting the fill assembly in a generally horizontal direction, said eliminator comprising:

a plurality on imperforate, spaced, aligned, upright wall members each having first, second and third angularly interconnected generally parallel, planar panels;

a plurality of upright, corrugated wall elements, each corrugated element being secured between adjacent wall members and having first, second and third angularly interconnected panels of longitudinally serpentine configuration, said first, second and third serpentine panels being disposed adjacent respective first, second and third planar panels, said serpentine panels forming peaks and valleys each of which has a linear extent, the linear extent of the peaks and valleys being at an angle with respect to adjacent zones of merger of the planar panels and the linear extent of the peaks and valleys of each of the serpentine panels being at an angle with respect to the linear extent of the peaks and valleys of the next adjacent serpentine panel;

each corrugated wall element having peaks and valleys and the respectively adjacent wall members cooperating to define spaces which present a plurality of generally vertically stacked, discrete air-receiving cells, each cell presenting inlet, intermediate and outlet diversion sections wherein the spaces between the first serpentine panel of each corrugated wall element and the first planar panels of the adjacent wall members present a plurality of vertically stacked, elongated inlet air diversion sections longitudinally oriented upwardly in a first direction, the spaces between the second serpentine panel of each corrugated wall element and the second planar panels of the adjacent wall members present a plurality of vertically stacked, elongated, intermediate diversion sections longitudinally oriented upwardly in a second direction different from said first direction, the spaces between the third serpentine panel of each corrugated wall element and the third planar panels of the adjacent wall members present a plurality of vertically stacked, elongated outlet diversion sections longitudinally oriented upwardly in a third direction different from said second direction; and each corrugated wall element having a plurality of individual perforations extending therethrough and disposed in upright alignment, the perforations being located at the zones of merger of the first and second serpentine panels and in each of the peaks of the corrugations of said first and second serpentine panels, perforations being operable to clear moisture from the walls of each cell as the crossflowing, moisture-laden air transits therethrough, the generally aligned perforations providing a downward moisture flow path through the cells for collecting moisture in the lowermost portion of the cooling tower.

2. The eliminator as set forth in claim 1, each perforation presenting an enlarged circular opening extending generally transversely through the respective corrugated wall element.

3. The eliminator as set forth in claim 1, said perforations being located proximate to the included angle between adjacent first and second planar panels, the V-shaped, vertically oriented, angular connection between the first and second planar panels cooperating with the generally vertically aligned perforations to provide the downward moisture flow path.

4. The eliminator as set forth in claim 1, wherein the longitudinal axes of said inlet and outlet diversion sections are co-planar.

5. The eliminator as set forth in claim 4, wherein the longitudinal axes of said inlet and outlet diversion sections intersect.

6. The eliminator as set forth in claim 1, wherein the third direction orientation of said outlet diversion sections is upward and generally aligned with the horizontal direction of said crossflowing air exiting the fill assembly.

* * * * *